June 10, 1969  L. A. HERNANDEZ, JR  3,448,527
QUICK FREEZE-DRYING SYSTEM AND APPARATUS THEREFOR
Filed Sept. 20, 1965

INVENTOR
LUIS A. HERNANDEZ, JR.
BY Allan M. Shapiro
ATTORNEY

United States Patent Office 3,448,527
Patented June 10, 1969

3,448,527
QUICK FREEZE-DRYING SYSTEM AND
APPARATUS THEREFOR
Luis A. Hernandez, Jr., Los Angeles, Calif. (6227 Laurel Grove Ave., North Hollywood, Calif. 91606)
Filed Sept. 20, 1965, Ser. No. 488,354
Int. Cl. F26b 5/06, 5/10
U.S. Cl. 34—5                      7 Claims

ABSTRACT OF THE DISCLOSURE

Freeze-drying system and apparatus employing heat transfer by means of direct heat radiation to the quick-frozen product and involving successive removal of thin dried layers of the product as by scraping the exposed product surface to effectively improve efficiency, economy and dried product quality. Also disclosed are system and apparatus for maintaining the dried condition of the removed product.

---

The present invention relates to freeze-drying systems and more particularly to a system and apparatus employing heat transfer by means of direct heat radiation to the quick-frozen product and involving successive removal of thin dried layers of the product to effectively minimize the occurrence of heat transfer by conduction, minimize the period of time during which the dried product is subjected to heat, minimize the degree of heat to which the dried product is subjected, and increase the effective sublimation rate so that the total time involved in the freeze-drying process is greatly reduced for improved efficiency and economy.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
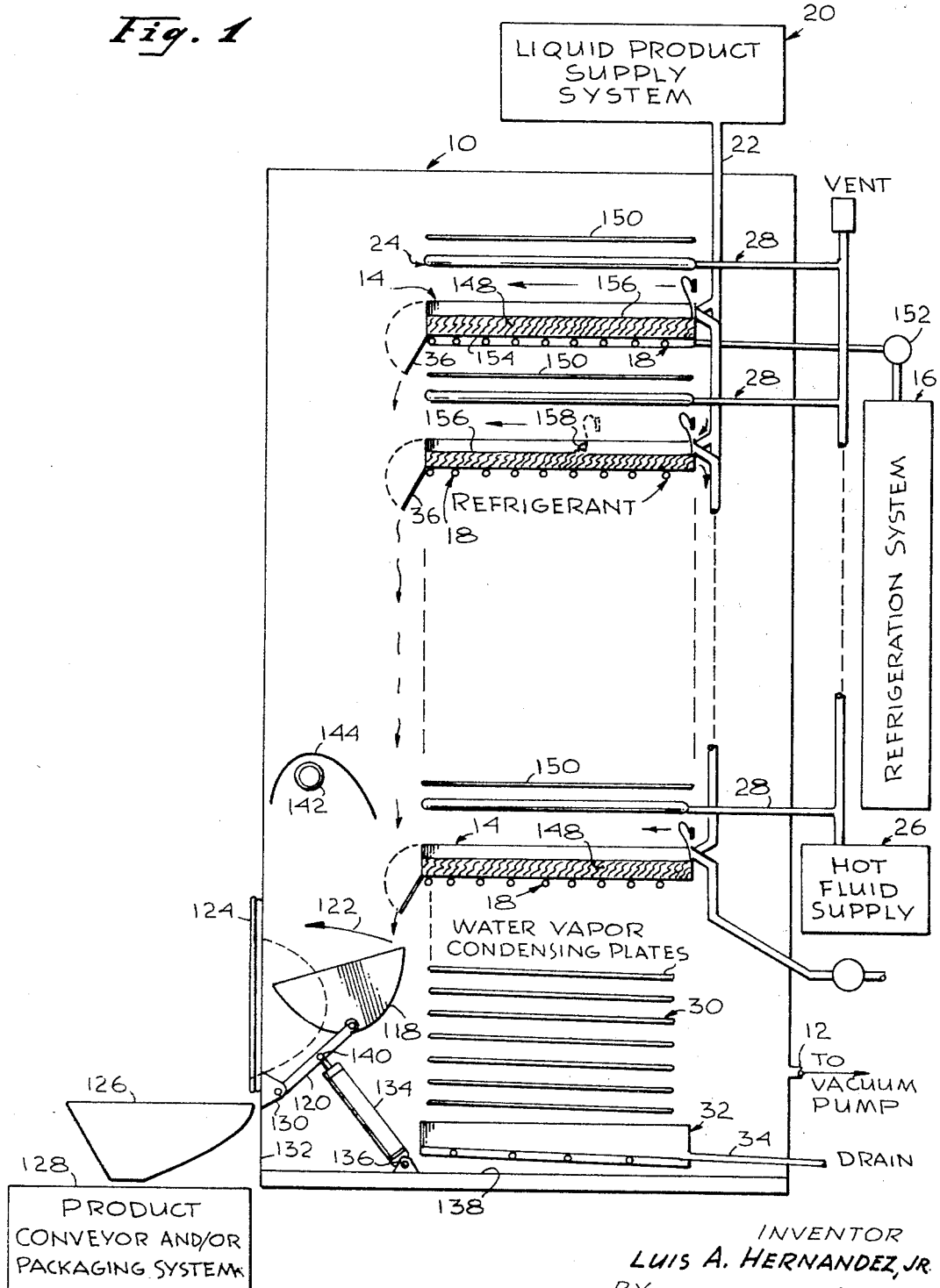
FIGURE 1 is a side elevational view, partly in section and partly diagrammatic, showing a preferred embodiment of apparatus in accordance with the present invention.

Referring to the drawings, there are indicated generally a vacuum chamber 10 having a port 12 to a vacuum pump (not shown), a plurality of freezing-sublimation trays 14, a refrigeration system 16 for circulating supply of a refrigerant through a plurality of ganged refrigeration coils 18 subjacent to each of the trays 14, a liquid product supply system 20 for gravity feed of the product through a conduit 22 to each of the trays 14, a plurality of heat radiators 24 each disposed above a respective one of the trays 14 and commonly supplied with heat energy from a heat source such as a hot fluid supply 26 via conduits 28, condenser means located either at top or bottom of the chamber and comprising a plurality of ganged water vapor condensing plates 30 commonly supplied with a refrigerant from a refrigeration source (not shown), and a defrost drain pan 32 subjacent to the condensing plates 30 for receiving water therefrom for gravity flow to a drain via conduit 34.

Figure 3:
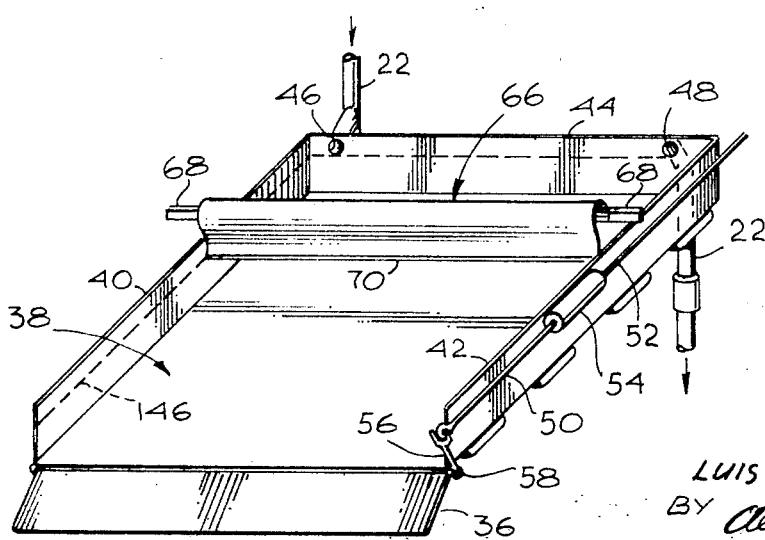
FIGURE 3 is a fragmentary enlarged perspective view of one of the freezing-sublimation trays and the scraper means in accordance with the present invention.

In accordance with preferred practice under the present invention, the entire freeze-drying process is performed within the vacuum chamber 10 and the freezing-sublimation trays 14 preferably are permanently stationary therewithin. Each tray has an end gate 36 which may be pivotally secured to the bottom plate 38 of the tray, a pair of stationary parallel side plates 40 and 42, and a stationary opposite end plate 44 having apertures 46 and 48 for respectively receiving and passing the liquid product from the receiving portion of the conduit 22 from the next higher tray and to the conduit 22 for transmission to the next lower tray, as best seen in FIGURES 1 and 3 and indicated by downwardly directed arrows therein, the liquid product falling through the aperture or exit port 48 as an overflow after filling of the tray from the entrance port 46. Of course, the end gate 36 is in an upper closed position relative to the remainder of the tray during the filling of the tray and until completion of the freezing portion of the process cycle.

Figure 2:
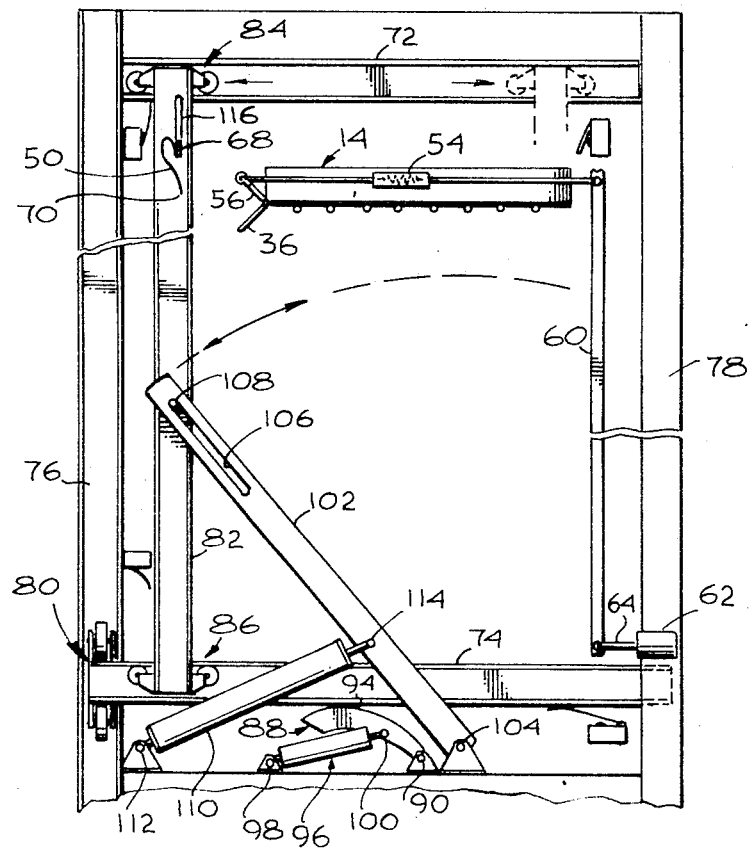
FIGURE 2 is a fragmentary elevational view, partly in section and partly diagrammatic, having the same aspect as FIGURE 1 and showing one form of scraper means in accordance with the present invention.

One form of actuator means for operating the end gate 36 is seen to comprise a pair of end-to-end rods 50 and 52 joined by a spring-loaded coupling member 54, one end of the rod 50 being pivotally coupled to one end of a lever 56, the other end of the lever 56 being secured to a lateral projection 58 of the end gate 36 for rotation thereof by arcuate movement of the lever 56 in either the clockwise closing or counterclockwise opening of the end gate 36 (such directions being as seen in FIGURE 2) such movement being occasioned by corresponding rectilinear horizontal movement of a tie bar 60 which simultaneously operates all of the tray end gates and is actuated as by a hydraulic or pneumatic cylinder 62 and its piston connecting rod 64 or mechanically, as desired.

In the illustrated preferred embodiment of the apparatus in accordance with the present invention, each tray 14 is provided with scraper means comprising a scraper blade 66 normally disposed within the tray 14 between the side walls 40 and 42 thereof and parallel to the end walls 36 and 44 so as to be transverse relative to the tray and adapted for longitudinal movement back and forth in gross. The scraper blade 66 includes a transverse rod 68 extending laterally in both directions beyond the tray side panels 40 and 42 and appropriately mounted at its ends on the driving mechanism of the scraper means for forcible scraping and return movements of the scraper blade 66, one such mechanism being illustrated and to be described hereinafter.

As seen in FIGURES 1 and 2, particularly the latter, a scraper blade driving mechanism is provided for driving the scraper blade 66 along a generally rectangular path or course, that is, from right to left while scraping the frozen product, then upwardly for a slight distance to assure avoidance of return scraping, then from left to right for non-scraping return of the scraper blade 66 to its starting position, and then downwardly until contact is made by the blade's bottom edge 70 with the frozen product for commencement of the scraping motion from right to left again. Only the mechanism on the near side of the chamber 10 is illustrated, it being understood that duplicate elements of the structural portions similarly reside on the far side of the chamber bracketing the trays 14, it being similarly understood that only one of the trays 14 and its scraper blade are illusrated in FIGURE 2 for convenience, the transverse rods 68 of the other scraper blades being similarly mounted for identical movement. A pair of horizontal frame members or tracks 72 and 74 are provided to guide and support horizontal movement and provide vertical lift, each being mounted at its opposite ends in a corresponding pair of vertical tracks 76 and 78 as by vertical travel support rollers, one such mounting being indicated generally at 80, whereby the horizontal frame tracks 72 and 74 are movable upwardly and downwardly together. A vertical support pillar member 82 is mounted at its opposite ends onto each of the horizontal frame members 72 and 74 by horizontal travel support rollers 84 and 86, respectively, whereby the vertical support member 82 is guided in its horizontal movement back and forth by the horizontal track members 72 and 74 and also moves vertically with such track members when the latter are vertically driven as hereinafter described. Vertical movement of elements 72, 74 and 82 is accomplished by a crank cam 88, one end of which is pivotally mounted at 90 to a stationary element of the chamber, a curved cam surface 94 at the other end portion being in slidable abutment with the lower horizontal support track 74 whereby pivotal movement of the lower frame track 74 and, consequently, the remainder of the afore-described frame and support members, such pivotal movement being caused by pressure actuation of hydraulic cylinder 96, one end of which is pivotally connected at 98 to a stationary element, with the piston connecting rod pivotally connected to the crank cam 88 at a fulcrum point 100. Horizontal movement of the vertical support member 82 is accomplished by a lever 102, one end of which is pivotally mounted at 104, the other end of which is provided with a lost-motion slot 106 in slidable and pivotal relationship to a pin 108 projecting laterally from the vertical support member 82. One end of a hydraulic cylinder 110 is pivotally mounted at 112 and its piston connecting rod is pivotally connected at 114 to the lever 102 for arcuate driving of such lever whereby the support pillar 82 is moved back and forth along the horizontal track members 72 and 74. The ends of the transverse rod 68 are mounted within a vertical slot 116 in the vertical support member 82 for carrying thereby, the slot 116 permitting slidable movement of the rod 68 therewithin in the vertical direction to accommodate changes in thickness in the frozen product during the scraping portion of the process cycle, as will become clearer hereinafter.

Referring to FIGURE 1 again, there is seen a dried product dump system comprising a bucket member or collector 118 adapted to receive and retain the dried product as it falls after scraping from the trays 14 and having a dumping lever 120 for swinging the bucket 118, in the direction indicated by the arrow 122 through a doorway normally closed by a door 124, for dumping the dried product into a hopper 126 for transmission to a product conveyor and/or packaging system 128. One end of the lever 120 is secured to the collector bucket 118 and the other end is pivotally secured at 130 to a wall 132 of the chamber 10. A hydraulic cylinder 134 has one end pivotally secured at 136 to the floor 138 of the chamber 10 and its piston connecting rod is pivotally secured to the lever 120 at 140 for arcuately driving the lever 120. A screw conveyor or other means may be employed to remove the dried product from the chamber 10.

A heat radiator 142 is disposed above the collector 118 in heat radiating relationship thereto for the primary purpose of maintaining the collected dried product in a dry state and is coupled as by a conduit (not shown) to the hot fluid supply 26 for a heat energy source. The final heat radiator 142 is provided with a shield member 144 which serves as both a heat reflector to direct the radiated heat downwardly toward the dried product in the collector 118 and also as a guide deflector for the falling dried product (indicated by wavy lines and arrows) for guidance thereof into the collector 118.

The operation of the above-described apparatus in accordance with the present invention, as well as additional details of construction, may be described in the following manner. First, a liquid product, such as fresh orange juice or coffee extract is supplied from the supply system 20 via the conduits 22 to each of the freezing-sublimation trays 14 until each thereof is full to the level (as indicated by the dash level line 146 in FIGURE 3) permitted by the exit port 48. Of course, other delivery systems could be employed, such as a pressure system with a distributor head. The refrigeration system 16 continuously supplies a refrigerant to the freezing coils 18 whereby and until the liquid product becomes a frozen product, as indicated at 148 in FIGURE 1, in substantially rectanguloid form. Then various valves (not shown) in the various conduits are closed and the vacuum chamber 10 is sealed and evacuated to create the appropriate vacuum in the chamber, such optionally being accomplished simultaneously with the final freezing portion of the cycle after the product has solidified, in order to save time. Upon completion of the freezing step, the refrigeration system 16 is turned off and, when the appropriate vacuum has been achieved, the hot fluid supply 26 is turned on for continuously supplying heat energy to the heat radiators 24 and 142. The radiators 24 preferably consist of hollow plates or coils substantially coextensive horizontally with the trays 14. It should be noted that a plurality of heat radiation shields 150 are disposed between each of the heat radiators 24 and the freezing-sublimation tray 14 immediately thereabove to prevent any undesirable radiation of heat to the bottom surface portion 154 of the frozen product 148. At the same time, the refrigeration system 16 supplies a refrigerant to the water vapor condensing plates 30 during the sublimation portion of the process cycle. As heat is radiated from the heat radiators 24 onto the exposed top surface 156 of the frozen product 148, the ice sublimes therefrom and its vapors are driven, by difference in vapor pressure, toward the condensing plates 30 for collection thereon in the form of ice, later to be melted during defrosting for collection by the drain pan 32. As a relatively thin and horizontally uniform portion or layer at the upper surface 156 of the frozen product 148 becomes dried or dehydrated in accordance with the sublimation occasioned by the received heat flux, the scraper blade driving mechanism is actuated for continually driving the scraper blade 66. As the edge 70 of the scraper blade 66 traverses the tray 14 in intimate contact with the upper surface 156, the dried product layer is scraped and removed thereby in substantially powder or crystal form, such powder or crystals being indicated at 158 in FIGURE 1 during the middle of the scraping step, and is dumped out the open end of the tray 14 for reception by the collector bucket 118. Thus, a new ice front is exposed as an effectively new top surface 156 of the frozen product for receiving the heat flux from the heat radiators 24 directly in the form of radiated heat rather than conducted heat through the previously dried (and now removed) thin layer. The foregoing steps of continuous heat radiation and continual successive scraping are maintained until the entire frozen product has been dried within the trays 14 and removed incrementally by the scraping action into the bucket 118. Due to the presence of water vapor within the vacuum chamber 10 during the foregoing sublimation step, the dried product within the bucket 118 undergoes final drying and is maintained in the dry state and prevented from water vapor absorption and/or adsorption by the final heat radiator 142. When all of the dried product resides in the bucket 118, the vacuum may be broken, the door 124 opened by any convenient manual or automatic mechanical means, and the dried product is dumped from the bucket 118 into the hopper 126 and the product handling system 128.

Thus, by maintaining an ice front or frozen surface as free from dried product as practicable, the heat radiators 24 are permitted to operate at higher temperatures than normally permissible or proper and generate relatively extremely high heat fluxes (bearing in mind the fourth power function of flux to temperature) directly onto the exposed ice front for obtaining a faster sublimation rate than heretofore practical or obtainable without destruction or, at least degradation of the dried product. In the absence of removal of the dried product layer, any ice underneath such dried product layer necessarily would receive the heat by means of heat conduction rather than radiation, and the heat flux of heat conduction mechanisms is normally slower than the heat fluxes of the heat radiation mechanism. Also, of course, prolonged exposure of the dried layer to both the radiated heat and the conducted heat may readily cause deterioration of the dried product due to high temperatures, which problem is obviated by the present invention.

It also should be noted importantly that the incremental removal of the dried layers attains direct vapor evolution from the ice front rather than passage of such vapor through the dried product layer, thus further increasing the rate of sublimation. Still further, by avoiding the passage of the water vapor from the ice front through a dried product layer, such vapors do not become overly superheated by the warm dried layer and, accordingly, a relatively lower condensing capacity is required for the water vapor condensing plates 30. In addition to the concomitant economies of the latter advantage, the condenser means can be small enough in size to be incorporated within the vacuum chamber as illustrated.

Thus, it can be seen that the practice of the present invention attains faster sublimation rates and higher dried product production per unit area of tray surface and/or unit volume of apparatus.

It should be noted that there is no necessity for heating surface temperature programming, as in the past, to compensate for varying heat transfer to the ice front either by means of radiation through a thickening dried layer or by conduction through a diminishing thickness of ice; in the first instance, a decreasing heat input normally is necessitated and, in the second instance, an increasing heat input is necessitated. In accordance with the present invention, the ice front is maintained free of interference with the radiant heat and, therefore, the heat flux onto the ice surface is substantially constant throughout the sublimation portion of the process.

It should be noted further that the heat absorptivity of water ice is approximately 96%, thereby maintaining a rate of heat transfer by radiation close to the theoretical maximum. In accordance therewith, it should be understood that the rate of operation of the scraper means should be rapid enough to prevent the dried layer from becoming more than relatively merely a film, since the formation of a relatively thick dried layer would constitute a radiant heat shield to diminish the heat flux to the ice front in an amount incompatible with the desired level of heat absorption, as well as to increase the temperature of the dried layer or film beyond the maximum safe design temperature to which the final product should be subjected. While the permissible thickness of the dried layer before removal takes place varies with the type of product and depends greatly upon the proportion of solid contents of the crystalline product, a thickness in the order of 0.001 inch is approximately correct. As should be clear, the relatively thick frozen product block or layer may have any thickness desired in accordance with the design considerations of size, volume and capacity for the overall apparatus.

Of course, various hydraulic and mechanical elements have been illustrated and described herein as being of particular types and/or constructions merely for convenience.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. Apparatus for freeze-drying a product comprising:
  (a) vacuum chamber means;
  (b) a plurality of product trays disposed within said vacuum chamber means and adapted to receive and contain a liquid product;
  (c) refrigeration means for freezing such liquid product whereby each of said trays contains frozen product in the form of a relatively thick layer having an exposed upper surface;
  (d) means for creating a vacuum in said vacuum chamber means;
  (e) a plurality of main heat radiators disposed in spaced relationship above respective ones of said trays for continuously radiating heat onto such exposed upper surface of the frozen product for causing ice to sublime from a relatively thin surface layer of the frozen product;
  (f) scraper means adapted to continually scrape each such exposed upper surface for successively removing each thin surface layer as it becomes dried;
  (g) collector means disposed within said vacuum chamber means remote from said main heat radiators for receiving and retaining such dried product layers as they are removed; and
  (h) a final heat radiator disposed within said vacuum chamber means for continuously radiating heat onto the dried product in said collector means at a heat level lower than that received by the frozen product from said main heat radiator so as to avoid deterioration of the dried product and of sufficient magnitude to prevent absorption and adsorption of water vapor by the dried product.

2. Apparatus for freeze-drying a product comprising:
  (a) vacuum chamber means;
  (b) a plurality of product trays disposed within said vacuum chamber means and adapted to receive and contain a liquid product;
  (c) refrigeration means for freezing such liquid product whereby each of said trays contains frozen product in the form of a relatively thick layer having an exposed upper surface;
  (d) means for creating a vacuum in said vacuum chamber means;
  (e) a plurality of heat radiators disposed in spaced relationship above respective ones of said trays for continuously radiating heat onto such exposed upper surface of the frozen product for causing ice to sublime from a relatively thin surface layer of the frozen product; and
  (f) scraper means adapted to continually scrape each such exposed upper surface for successively removing each thin surface layer as it becomes dried, said scraper means comprising
    (1) horizontal track means;
    (2) vertical member means mounted on said track means in horizontally movable relationship thereto and adapted for back and forth movement alongside of said trays; and
    (3) a plurality of scraper blades each associated with a respective one of said trays transversely thereof in at least successively contacting relationship with such exposed upper surface of the frozen product and mounted on said vertical member means in vertically movable relationship thereto, said blade being adapted to apply a scraping force to such exposed upper surface sufficient to remove only such relatively thin dried surface layer.

3. Apparatus in accordance with claim 2 wherein: said horizontal track means is vertically movable and adapted to move upwardly for lifting said scraper blades clear of such exposed product surface via said vertical member means upon termination of horizontal scraping movement in one horizontal direction, and adapted to move downwardly upon termination of horizontal return movement in the other horizontal direction for permitting said scraper blades to renew contact with such exposed product surface.

4. In a freeze-drying system, in combination with a vacuum chamber means, water vapor condenser means, and heat source means, apparatus comprising:
  (a) a plurality of product trays disposed within said vacuum chamber means and containing a frozen product in the form of a relatively thick layer having an exposed upper surface;

(b) a plurality of main heat radiators disposed in spaced relationship above respective ones of said trays for continuously radiating heat onto such exposed upper surface of the frozen product for causing ice to sublime from a relatively thin surface layer of the frozen product;

(c) scraper means adapted to continually scrape each such exposed upper surface for successively removing each thin surface layer as it becomes dried;

(d) collector means disposed within said vacuum chamber means remote from said main heat radiators for receiving and retaining such dried product layers as they are removed; and (e) a final heat radiator disposed within said vacuum chamber means for continuously radiating heat onto the dried product in said collector means at a heat level lower than that received by the frozen product from said main heat radiator so as to avoid deterioration of the dried product and of sufficient magnitude to prevent absorption and adsorption of water vapor by the dried product.

5. In a freeze-drying system, in combination with a vacuum chamber means, water vapor condenser means, and heat source means, apparatus comprising:

(a) a plurality of product trays disposed within said vacuum chamber means and containing a frozen product in the form of a relatively thick layer having an exposed upper surface;

(b) a plurality of heat radiators disposed in spaced relationship above respective ones of said trays for continuously radiating heat onto such exposed upper surface of the frozen product for causing ice to sublime from a relatively thin surface layer of the frozen product; and (c) scraper means adapted to continually scrape each such exposed upper surface for successively removing each thin surface layer as it becomes dried, said scraper means comprising
  (1) horizontal track means;
  (2) vertical member means mounted on said track means in horizontally movable relationship thereto and adapted for back and forth movement alongside of said trays; and
  (3) a plurality of scraper blades each associated with a respective one of said trays transversely thereof in at least successively contacting relationship with such exposed upper surface of the frozen product and mounted on said vertical member means in vertically movable relationship thereto, said blade being adapted to apply a scraping force to such exposed upper surface sufficient to remove only such relatively thin dried surface layer.

6. The invention as defined in claim 5 wherein: said horizontal track means is vertically movable and adapted to move upwardly for lifting said scraper blades clear of such exposed product surface via said vertical member means upon termination of horizontal scraping movement in one horizontal direction, and adapted to move downwardly upon termination of horizontal return movement in the other horizontal direction for permitting said scraper blades to renew contact with such exposed product surface.

7. The method of dehydrating a product by sublimation of its water content comprising the steps of:

(a) freezing the product into a relatively thick layer;

(b) sublimating the water ice from a relatively thin surface layer of the frozen product by direct radiant heat thereon in vacuo;

(c) removing the dehydrated product layer from the frozen product;

(d) continuously performing step (b) and continually repeating step (c) until all of the frozen product has been dehydrated and removed;

(e) continually receiving and retaining the removed dried product layers in a common collector remote from such direct radiant heat; and (f) continuously radiating heat onto the dried product in the collector until all of the dried product is received therein, at a heat level low enough to avoid deterioration of the dried product and high enough to prevent absorption and adsorption of water vapor by the dried product.

References Cited

UNITED STATES PATENTS

| | | | |
|---|---|---|---|
| 2,406,682 | 8/1946 | Hayes | 34—5 |
| 2,411,152 | 11/1946 | Folsom | 34—5 |
| 2,528,476 | 10/1950 | Roos | 34—5 |
| 2,552,360 | 5/1951 | Zichis | 34—5 |
| 3,234,658 | 2/1966 | Hackenberg | 34—5 |
| 3,257,731 | 6/1966 | Vigano | 34—5 |
| 3,281,956 | 11/1966 | Mason | 34—5 |

FOREIGN PATENTS 936,054   9/1963   Great Britain.

WILLIAM J. WYE, *Primary Examiner.*